(12) United States Patent
Ono

(10) Patent No.: US 10,753,065 B2
(45) Date of Patent: Aug. 25, 2020

(54) CONTROL METHOD AND MOTOR GRADER

(71) Applicant: KOMATSU LTD., Minato-ku, Tokyo (JP)

(72) Inventor: Yutaka Ono, Tokyo (JP)

(73) Assignee: KOMATSU LTD., Minato-ku, Tokyo (JP)

( * ) Notice: Subject to any disclaimer, the term of this patent is extended or adjusted under 35 U.S.C. 154(b) by 66 days.

(21) Appl. No.: 16/082,634

(22) PCT Filed: Feb. 27, 2017

(86) PCT No.: PCT/JP2017/007456
§ 371 (c)(1),
(2) Date: Sep. 6, 2018

(87) PCT Pub. No.: WO2017/163767
PCT Pub. Date: Sep. 28, 2017

(65) Prior Publication Data
US 2019/0085528 A1    Mar. 21, 2019

(30) Foreign Application Priority Data
Mar. 23, 2016    (JP) .................. 2016-058841

(51) Int. Cl.
*E02F 3/76*    (2006.01)
*B60K 28/16*    (2006.01)
(Continued)

(52) U.S. Cl.
CPC .......... *E02F 3/7668* (2013.01); *B60K 28/16* (2013.01); *E02F 3/7636* (2013.01);
(Continued)

(58) Field of Classification Search
CPC ..... E02F 3/7668; E02F 3/7636; E02F 3/7663; E02F 3/8157; E02F 3/841; E02F 9/2029;
(Continued)

(56) References Cited

U.S. PATENT DOCUMENTS 3,426,146 A * 2/1969 Seaman .................. E02F 3/842
                                                    348/118
3,494,426 A * 2/1970 Studebaker ............. E02F 3/847
                                                    172/4.5
(Continued)

FOREIGN PATENT DOCUMENTS

CN    101238253 A    8/2008
CN    103140632 A    6/2013
(Continued)

*Primary Examiner* — Abigail A Risic
(74) *Attorney, Agent, or Firm* — Faegre Drinker Biddle & Reath LLP

(57) ABSTRACT

A control method is performed in a motor grader, the motor grader including a blade between a front wheel and a rear wheel, the blade being attached to a swing circle which adjusts a blade angle. The control method includes detecting a load applied to the blade and revolving, when the detected load is larger in value than a predetermined reference value, the swing circle in such a direction that the blade angle is smaller than the blade angle at the time of detection of that value.

22 Claims, 10 Drawing Sheets

(51) Int. Cl.
*E02F 3/84* (2006.01)
*E02F 9/20* (2006.01)
*E02F 9/24* (2006.01)
*E02F 9/26* (2006.01)
*E02F 3/815* (2006.01)

(52) U.S. Cl.
CPC .......... *E02F 3/7663* (2013.01); *E02F 3/8157* (2013.01); *E02F 3/841* (2013.01); *E02F 9/2029* (2013.01); *E02F 9/24* (2013.01); *E02F 9/26* (2013.01); *E02F 9/265* (2013.01)

(58) Field of Classification Search
CPC ..... E02F 9/24; E02F 9/26; E02F 9/265; E02F 3/844; E02F 3/7654; E02F 3/847; E02F 9/262; E02F 9/2037
See application file for complete search history.

(56) References Cited

U.S. PATENT DOCUMENTS

| | | | |
|---|---|---|---|
| 3,786,871 A * | 1/1974 | Long | E02F 3/845 |
| | | | 172/4.5 |
| 7,676,967 B2 | 3/2010 | Gharsalli et al. | |
| 7,874,377 B1 * | 1/2011 | Graeve | E02F 3/7668 |
| | | | 172/796 |
| 8,649,944 B2 | 2/2014 | Hayashi et al. | |
| 8,948,978 B2 | 2/2015 | Liu et al. | |
| 9,970,180 B2 * | 5/2018 | Enix | E02F 9/2045 |
| 10,066,367 B1 * | 9/2018 | Wang | E02F 9/262 |
| 2006/0042804 A1 * | 3/2006 | Pecchio | E02F 3/842 |
| | | | 172/4.5 |
| 2008/0185162 A1 | 8/2008 | Maeda | |
| 2012/0130600 A1 | 5/2012 | Thomson et al. | |
| 2012/0236142 A1 * | 9/2012 | Enix | E02F 9/2045 |
| | | | 348/118 |
| 2013/0085644 A1 | 4/2013 | Hayashi et al. | |
| 2016/0108604 A1 * | 4/2016 | West | E02F 3/847 |
| | | | 701/50 |
| 2016/0123258 A1 * | 5/2016 | Lack | F02D 41/0235 |
| | | | 60/274 |
| 2016/0153166 A1 * | 6/2016 | Gentle | E02F 3/844 |
| | | | 172/781 |

FOREIGN PATENT DOCUMENTS

| | | |
|---|---|---|
| JP | S52-75003 A | 6/1977 |
| JP | 07090879 A * | 4/1995 |
| JP | H08-105025 A | 4/1996 |
| WO | WO-2013/047179 A1 | 4/2013 |
| WO | WO-2016/027463 A1 | 2/2016 |

* cited by examiner (A)

(B)

CONTROL METHOD AND MOTOR GRADER

TECHNICAL FIELD

The present invention relates to a control method in a motor grader and to a motor grader.

BACKGROUND ART

A motor grader has conventionally been known as a work vehicle.

For example, U.S. Pat. No. 7,874,377 (PTD 1) discloses a motor grader equipped with a circle drive arrangement including a variable displacement motor. The variable displacement motor operates at a high speed for driving the circle at a high speed, as when the blade is elevated above the ground and the grader is turning around for reversing the operation of the blade. The variable displacement motor operates at a high torque for driving the circle to change the angle of operation of the blade relative to the grader frame when the blade is in ground contact.

US Patent Application Publication No. 2012/0130600 (PTD 2) discloses a method and the like implemented within a motor grader or other machine. The machine includes a ground engaging element (specifically, a plurality of wheels) as well as one or more blades for removing surface material. With this method, slippage of the ground engaging element against the underlying surface is prevented. With this method, a torque limit is applied. The torque limit corresponds to a torque that is less than that required for slippage under the current operating conditions, thus avoiding the problems caused by both overly aggressive and overly conservative cut depth strategies.

CITATION LIST

Patent Document

PTD 1: U.S. Pat. No. 7,874,377
PTD 2: US Patent Application Publication No. 2012/0130600

SUMMARY OF INVENTION

Technical Problem

In the motor grader, a wheel may slip (idle) when a high load is applied to the blade as described above. Since the torque itself is limited with the technique in PTD 2, the motor grader may not be able to move forward even though slippage of the wheel could be prevented. Therefore, with the technique in PTD 2, works may not proceed.

The present invention was made in view of the problems above, and an object thereof is to provide a control method in a motor grader and a motor grader which allow works to proceed even though a high load is applied to a blade.

Solution to Problem

According to one aspect of the present invention, a control method is performed in a motor grader, the motor grader including a blade between a front wheel and a rear wheel, the blade being attached to a swing circle which adjusts a blade angle. The control method includes detecting a load applied to the blade and revolving, when the detected load is at a first excessively large value larger than a predetermined reference value, the swing circle in such a direction that the blade angle is smaller than the blade angle at the time of detection of the first excessively large value.

Advantageous Effects of Invention

According to the invention above, works can proceed even though a high load is applied to a blade.

DESCRIPTION OF EMBODIMENTS

Figure 1:
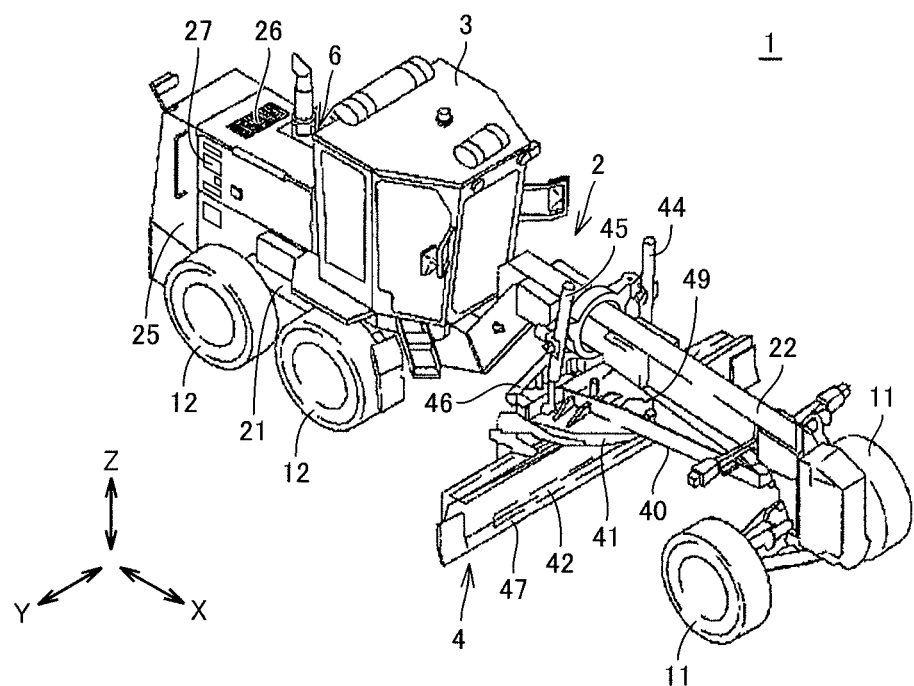
FIG. 1 is a perspective view schematically showing a construction of a motor grader.

A work vehicle according to an embodiment will be described below. The same elements have the same reference characters allotted in the description below and their labels and functions are also the same. Therefore, detailed description thereof will not be repeated.

<A. Appearance>

Figure 2:
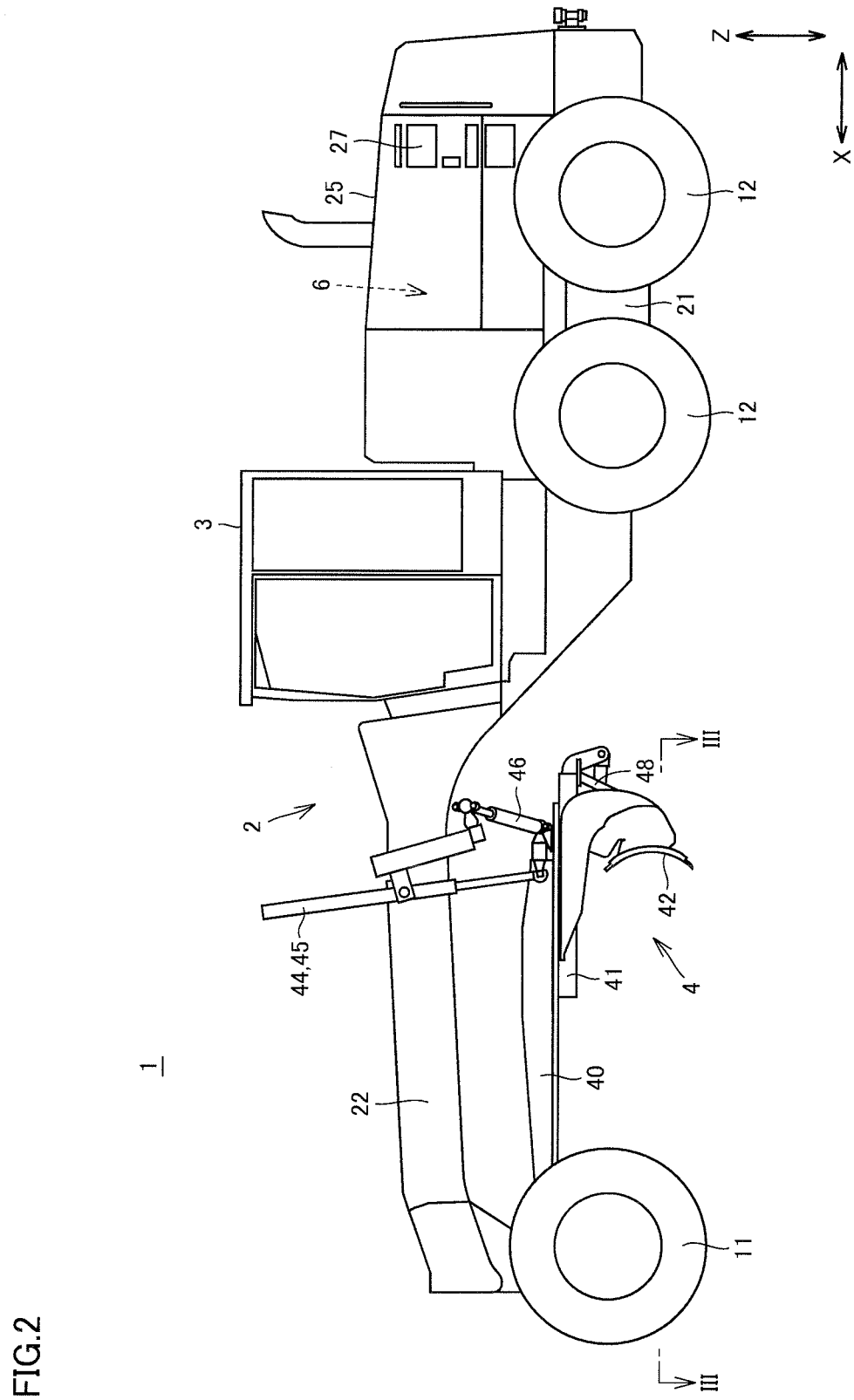
FIG. 2 is a side view schematically showing the construction of the motor grader.

FIG. 1 is a perspective view schematically showing a construction of a motor grader 1 in one embodiment of the present invention. FIG. 2 is a side view schematically showing the construction of motor grader 1. As shown in FIGS. 1 and 2, motor grader 1 in the present embodiment mainly includes running wheels 11 and 12, a vehicular body frame 2, a cab 3, and a work implement 4. Motor grader 1 includes components such as an engine arranged in an engine compartment 6. Work implement 4 includes a blade 42. Motor grader 1 can do such works as land-grading works, snow removal works, light cutting, and mixing of materials with blade 42.

Running wheels 11 and 12 include a front wheel 11 and a rear wheel 12. Though FIGS. 1 and 2 show running wheels consisting of two front wheels 11 one on each side and four rear wheels 12 two on each side, the number of front wheels and rear wheels and arrangement thereof are not limited as such.

In the description of the drawings below, a fore/aft direction means a fore/aft direction of motor grader 1. Namely, the fore/aft direction means a fore/aft direction when viewed from an operator who sits at an operator's seat in cab 3. A lateral direction or a side direction means a direction of a vehicle width of motor grader 1. Namely, the lateral direction, the direction of the vehicle width, or the side direction means the lateral direction when viewed from the operator who sits at the operator's seat in cab 3. In the drawings below, the fore/aft direction is shown with an arrow X, the lateral direction is shown with an arrow Y, and an up/down direction is shown with an arrow Z.

Vehicular body frame 2 includes a rear frame 21, a front frame 22, and an exterior cover 25. Rear frame 21 supports exterior cover 25 and components such as the engine arranged in engine compartment 6. Exterior cover 25 covers engine compartment 6. Exterior cover 25 is provided with an upper opening 26, a lateral opening 27, and a rear opening. Upper opening 26, lateral opening 27, and the rear opening are provided to pass through exterior cover 25 in a direction of thickness.

For example, each of four rear wheels 12 is attached to rear frame 21 as being rotatably driven by driving force from the engine. Front frame 22 is attached in front of rear frame 21. For example, two front wheels 11 are rotatably attached to a front end portion of front frame 22.

Cab 3 is carried on front frame 22. In cab 3, an operation portion (not shown) such as a steering wheel, a gear shift lever, a lever for controlling work implement 4, a brake, an accelerator pedal, and an inching pedal is provided. Cab 3 may be carried on rear frame 21.

Work implement 4 mainly includes a draw bar 40, a swing circle 41, a blade 42, a slewing motor 49, and various hydraulic cylinders 44 to 48.

Draw bar 40 has a front end portion swingably attached to the front end portion of front frame 22. Draw bar 40 has a rear end portion supported on front frame 22 by a pair of lift cylinders 44 and 45. As a result of synchronous extending and retracting of the pair of lift cylinders 44 and 45, the rear end portion of draw bar 40 can move up and down with respect to front frame 22. Draw bar 40 is vertically swingable with an axis along a direction of travel of the vehicle being defined as the center, as a result of extending and retracting of lift cylinders 44 and 45 different from each other.

A draw bar shift cylinder 46 is attached to front frame 22 and a side end portion of draw bar 40. As a result of extending and retracting of draw bar shift cylinder 46, draw bar 40 is movable laterally with respect to front frame 22.

Figure 3:
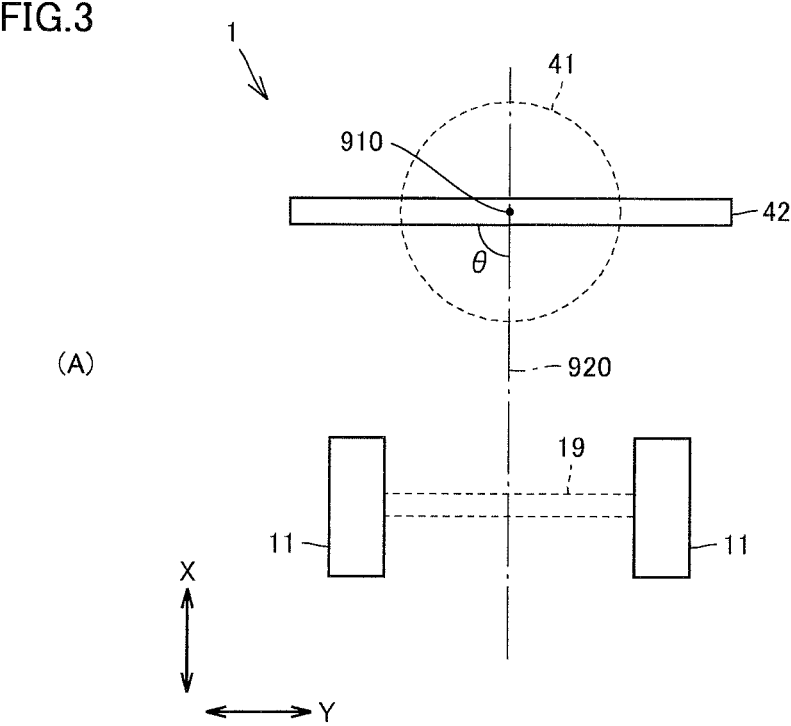
FIG. 3 is a diagram for illustrating a blade angle.
Figure 3:
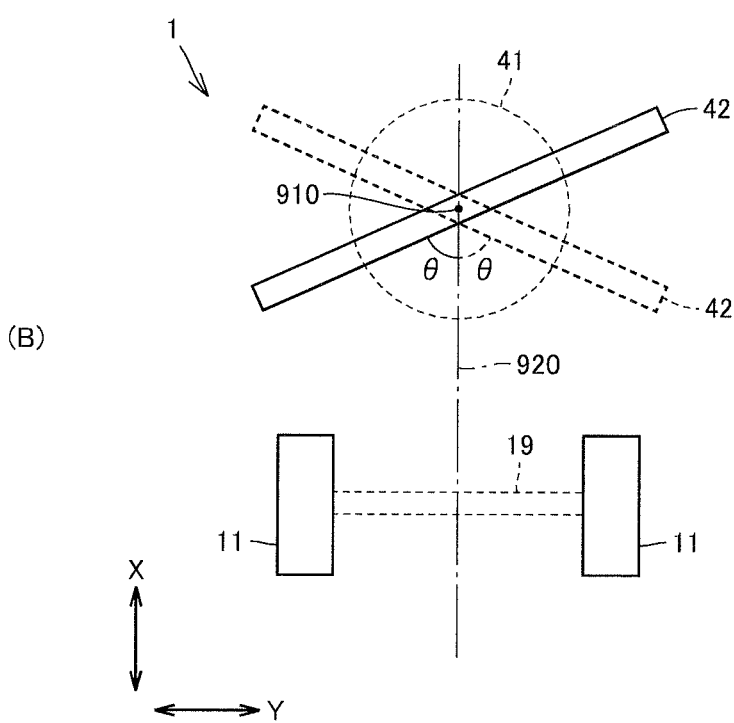

Swing circle 41 is revolvably (rotatably) attached to the rear end portion of draw bar 40. Swing circle 41 can be driven by slewing motor 49 as being revolvable clockwise or counterclockwise with respect to draw bar 40 when viewed from above the vehicle. Slewing motor 49 is implemented by a variable displacement hydraulic motor. As swing circle 41 is driven to revolve, a blade angle of blade 42 is adjusted. The blade angle will be described later (FIG. 3).

Blade 42 is supported as being slidable in the lateral direction with respect to swing circle 41 and as being vertically swingable with an axis in parallel to the lateral direction being defined as the center. Specifically, blade shift cylinder 47 is attached to swing circle 41 and blade 42 and arranged along a longitudinal direction of blade 42. With blade shift cylinder 47, blade 42 is movable in the lateral direction with respect to swing circle 41.

A tilt cylinder 48 is attached to swing circle 41 and blade 42. As a result of extending and retracting of tilt cylinder 48, blade 42 swings around the axis in parallel to the lateral direction with respect to swing circle 41, and can change its orientation in the up/down direction. Tilt cylinder 48 can thus change an angle of inclination with respect to the direction of travel of blade 42.

As set forth above, blade 42 is constructed to be able to move up and down with respect to the vehicle, change an inclination with respect to the direction of travel, change an inclination with respect to the lateral direction, rotate, and shift in the lateral direction, with draw bar 40 and swing circle 41 being interposed.

<B. Blade Angle>

FIG. 3 is a diagram for illustrating a blade angle. As shown in states (A) and (B) in FIG. 3, blade 42 rotates around a rotation axis 910 as swing circle 41 is driven to revolve. The state (A) corresponds to the cross-sectional view along the line in FIG. 2.

Front wheel 11 is connected to an axle shaft 19. Axle shaft 19 is orthogonal to a central axis 920 of front frame 22.

A blade angle θ refers to an angle formed between the direction of travel of the vehicular body and blade 42. Exactly speaking, blade angle θ refers to an angle formed between the direction of travel of the vehicular body (a forward direction) and blade 42 while motor grader 1 travels straight. In other words, blade angle θ can be referred to as an angle formed between central axis 920 of front frame 22 and blade 42. Blade angle θ is normally set in a range between 45 degrees and 60 degrees. A range of blade angle θ is set to a range not smaller than 0 degree and not larger than 90 degrees.

<C. System Configuration>

Figure 4:
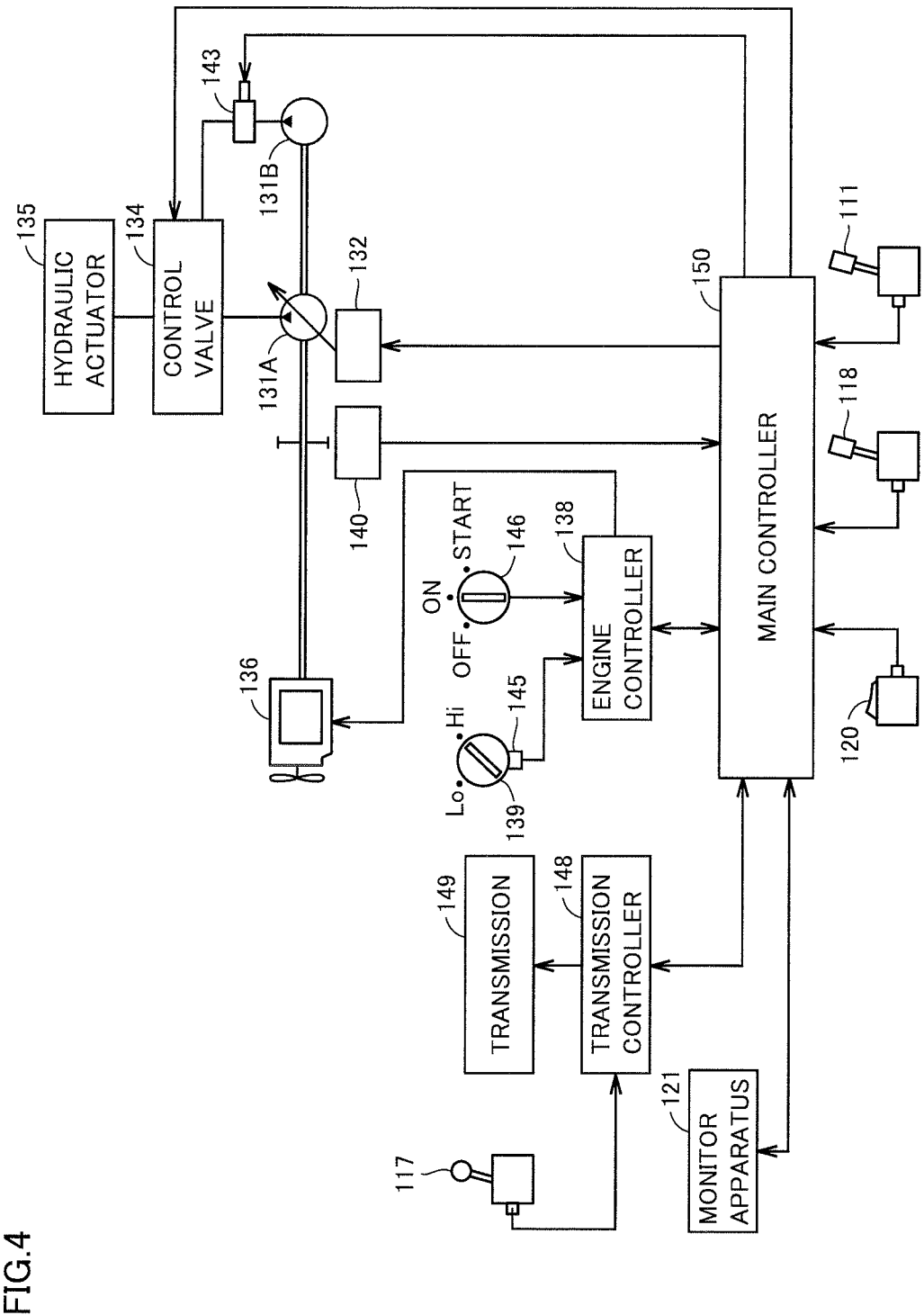
FIG. 4 is a simplified diagram showing a configuration of a control system of the motor grader.

FIG. 4 is a simplified diagram showing a configuration of a control system of motor grader 1. As shown in FIG. 4, the control system of motor grader 1 includes, by way of example, a work implement lever 118, a travel control lever 111, a locking switch 120, a monitor apparatus 121, a first hydraulic pump 131A, a second hydraulic pump 131B, a swash plate drive apparatus 132, a control valve 134, a hydraulic actuator 135, an engine 136, an engine controller 138, a throttle dial 139, an engine rotation sensor 140, a switch valve 143, a potentiometer 145, a starter switch 146, a main controller 150, a gear shift lever 117, a transmission controller 148, and a transmission 149.

First hydraulic pump 131A is implemented by a variable displacement hydraulic motor and delivers hydraulic oil used for driving work implement 4 and the like. Second hydraulic pump 131B is implemented by a fixed displacement hydraulic motor and delivers oil used for a hydraulic pressure (pilot pressure) applied to control valve 134. Swash plate drive apparatus 132 is connected to first hydraulic pump 131A.

Swash plate drive apparatus 132 is driven based on an instruction from main controller 150 and changes an angle of inclination of a swash plate of first hydraulic pump 131A. Hydraulic actuator 135 is connected to first hydraulic pump 131A with control valve 134 being interposed. Hydraulic actuator 135 includes lift cylinders 44 and 45, draw bar shift cylinder 46, blade shift cylinder 47, tilt cylinder 48, and slewing motor 49.

Control valve 134 is implemented by a proportional solenoid valve and connected to main controller 150. Main controller 150 outputs an operation signal (electric signal) in accordance with a direction of operation and/or an amount of operation of work implement lever 118 and travel control lever 111. Control valve 134 controls an amount of hydraulic oil to be supplied from first hydraulic pump 131A to hydraulic actuator 135 in accordance with the operation signal.

Work implement lever 118, travel control lever 111, and locking switch 120 are connected to main controller 150.

Main controller 150 outputs a lever operation signal (electric signal) in accordance with a state of operation of work implement lever 118 to control valve 134. Main controller 150 outputs a switch operation signal (electric signal) in accordance with a state of operation of locking switch 120 to switch valve 143. Main controller 150 outputs a lever operation signal (electric signal) in accordance with a state of operation of travel control lever 111 to transmission controller 148. Switch valve 143 is implemented by an electromagnetic switch valve.

Engine 136 has a driveshaft connected to first hydraulic pump 131A and second hydraulic pump 131B.

Engine controller 138 controls an operation of engine 136. Engine 136 is implemented by a diesel engine by way of example. The number of rotations of engine 136 is set through throttle dial 139 or the like, and an actual number of rotations of the engine is detected by engine rotation sensor 140. Engine rotation sensor 140 is connected to main controller 150.

Potentiometer 145 is provided in throttle dial 139. Potentiometer 145 detects a set value (an amount of operation) of throttle dial 139. The set value of throttle dial 139 is transmitted to main controller 150. Potentiometer 145 outputs a command value for the number of rotations of engine 136 to engine controller 138. A target number of rotations of engine 136 is adjusted in accordance with the command value.

Engine controller 138 adjusts the number of rotations of engine 136 by controlling an amount of fuel injection by a fuel injection apparatus in accordance with an instruction from main controller 150.

Starter switch 146 is connected to engine controller 138. When an operator operates starter switch 146 (sets start), a start signal is output to engine controller 138 so that engine 136 starts.

Transmission controller 148 controls an operation of transmission 149. Transmission controller 148 outputs an operation signal (electric signal) in accordance with a direction of operation and/or an amount of operation of gear shift lever 117 to transmission 149. A gear position of transmission 149 is changed as a clutch is controlled in accordance with the operation signal. Transmission controller 148 outputs an operation signal (electric signal) in accordance with a direction of operation and/or an amount of operation of gear shift lever 117 to main controller 150.

Main controller 150 is a controller which controls the entire motor grader 1 and implemented by a central processing unit (CPU), a non-volatile memory, a timer, and the like. Main controller 150 controls engine controller 138, transmission controller 148, and monitor apparatus 121. Though a configuration in which main controller 150, engine controller 138, and transmission controller 148 are separate from one another is described in the present example, they can also be implemented as one common controller.

Locking switch 120 is connected to main controller 150. When locking switch 120 is operated toward a locking side, main controller 150 senses that operation and transmits a signal to switch valve 143. Switch valve 143 thus cuts off supply of oil, and hence a function such as an operation of work implement 4 can be stopped.

<D. Control of Blade Angle>

Figure 5:
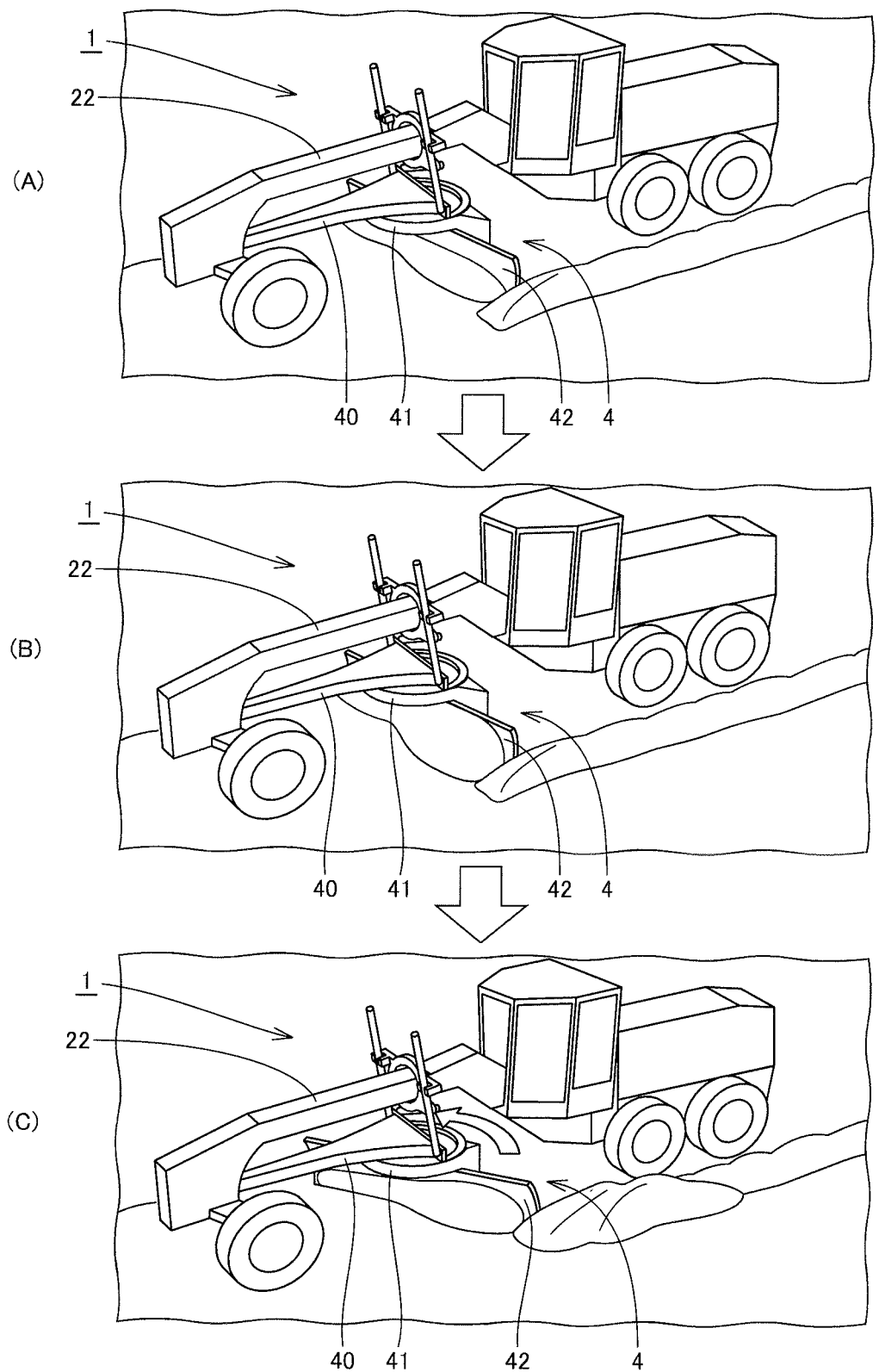
FIG. 5 is a diagram for illustrating control of rotation of a blade.

FIG. 5 is a diagram for illustrating control of rotation of blade 42. As shown in FIG. 5, a state (A) shows an example in which a load applied to blade 42 (specifically, magnitude of a load) is smaller than a predetermined reference value (which will also be referred to as a "reference value T" below). A value of blade angle θ at this time is denoted as θ1 below. θ1 is a value set by an operator (a default value). θ1 is typically between 45 degrees and 60 degrees. Blade angle θ is automatically controlled within a range not smaller than 0 degree and not larger than θ1 below.

A state (B) shows a moment when the load applied to blade 42 exceeds reference value T as a result of blade 42 holding soil more than in the state (A) while blade angle θ is set to θ1.

In this case, as shown also in a state (C), motor grader 1 revolves swing circle 41 in a direction in which blade angle θ becomes smaller than θ1 (in a direction shown with an arrow in the figure). Motor grader 1 once stops revolution of swing circle 41 when a load applied to blade 42 becomes smaller than reference value T as a result of revolution of swing circle 41. A value of blade angle θ at this time is denoted as θ2 (<θ1).

Thereafter, motor grader 1 revolves swing circle 41 in a direction in which blade angle θ is larger than θ2 (revolves in a reverse direction). When a load applied to blade 42 again exceeds reference value T, motor grader 1 revolves swing circle 41 in the direction in which blade angle θ becomes smaller.

Thus, when a load applied to blade 42 exceeds reference value T, motor grader 1 revolves swing circle 41 in the direction to make blade angle θ smaller, and when a load applied to blade 42 thereafter becomes smaller than reference value T, the motor grader revolves swing circle 41 in the direction to increase blade angle θ. This process is thereafter repeated.

The process above is described as follows, with attention being paid to one aspect.

(1) When a detected load is at a first excessively large value larger than reference value T, motor grader 1 revolves swing circle 41 in the direction in which blade angle θ becomes smaller than blade angle θ at the time of detection of the first excessively large value.

Under the control of blade angle θ, when a load applied to blade 42 is at the first excessively large value larger than reference value T, blade 42 rotates in the direction in which blade angle θ is smaller than the blade angle at the time of detection of the first excessively large value. Therefore, an amount of soil held by blade 42 can be decreased. Since the load applied to blade 42 can thus be reduced, rear wheel 12 representing a drive wheel can normally rotate without idling. Therefore, motor grader 1 can proceed with works even though a high load is applied to blade 42.

(2) When a load detected after revolution of swing circle 41 in the direction to make blade angle θ smaller is at a first excessively small value smaller than reference value T, motor grader 1 revolves swing circle 41 in the direction in which blade angle θ is larger than blade angle θ at the time of detection of the first excessively small value.

Under such control, when a load applied to the blade is at the first excessively small value smaller than reference value T under the control to make blade angle θ smaller, blade 42 rotates in the direction in which blade angle θ is larger than the blade angle at the time of detection of the first excessively small value. An amount of soil held by blade 42 can thus be increased. Therefore, efficiency in works can be higher than when blade angle θ is maintained small.

A method of detecting a load applied to blade 42 will be described later.

<E. Functional Configuration>

Figure 6:
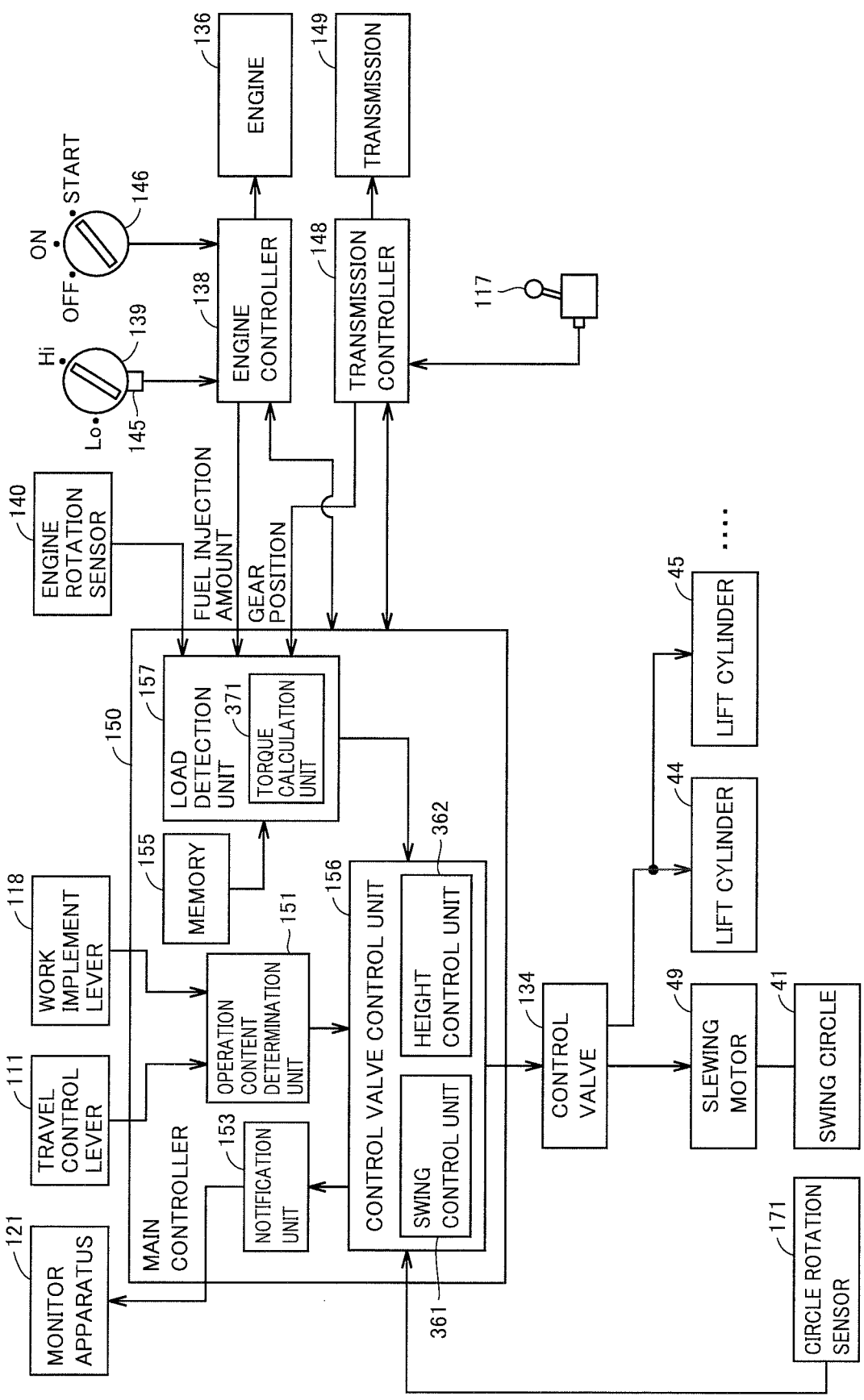
FIG. 6 is a functional block diagram illustrating a main controller in the control system of the motor grader.

FIG. 6 is a functional block diagram illustrating main controller 150 of the control system of motor grader 1.

FIG. 6 shows relation between main controller 150 and other peripherals. Work implement lever 118, travel control lever 111, monitor apparatus 121, engine 136, engine controller 138, gear shift lever 117, transmission controller 148, transmission 149, throttle dial 139, potentiometer 145, starter switch 146, engine rotation sensor 140, control valve 134, circle rotation sensor 171, slewing motor 49, lift cylinders 44 and 45, and swing circle 41 are shown as the peripherals.

Circle rotation sensor 171 detects an angle of rotation (typically, blade angle θ) of swing circle 41. Circle rotation sensor 171 transmits information on the angle of rotation to a control valve control unit 156.

Main controller 150 includes an operation content determination unit 151, a notification unit 153, a memory 155, control valve control unit 156, and a load detection unit 157. Control valve control unit 156 includes a swing control unit 361 and a height control unit 362. Load detection unit 157 includes a torque calculation unit 371. "Main controller 150" and "load detection unit 157" represent examples of the "controller" and the "load detection device" in the present invention, respectively.

Notification unit 153 instructs monitor apparatus 121 to give guidance information in accordance with an instruction from control valve control unit 156.

Operation content determination unit 151 determines contents of an operation onto work implement lever 118 by an operator. Operation content determination unit 151 outputs a result of determination to control valve control unit 156.

Memory 155 stores various types of information on engine output torque. Specifically, memory 155 stores information on an engine output torque curve.

Load detection unit 157 calculates a load applied to blade 42. Detection of the load will be described in detail as below.

Torque calculation unit 371 of load detection unit 157 calculates torque output from engine 136 of motor grader 1. Specifically, torque calculation unit 371 obtains information on the number of rotations of engine 136 from engine rotation sensor 140. Torque calculation unit 371 obtains information on an amount of fuel injection from engine rotation sensor 140. Torque calculation unit 371 calculates torque based on the number of rotations of engine 136 obtained from engine controller 138 and an amount of fuel injection in engine 136 obtained from engine controller 138.

More specifically, torque calculation unit 371 calculates torque based on the number of rotations of engine 136 obtained from engine rotation sensor 140 and an amount of fuel injection in engine 136 obtained from engine controller 138 by referring to a map (data) stored in memory 155 in which the number of rotations of the engine, an amount of fuel injection, and torque are associated with one another.

Load detection unit 157 obtains information on a gear position (information on a gear speed) in transmission 149 from transmission controller 148. Load detection unit 157 detects a load involved with blade 42 based on torque calculated by torque calculation unit 371 and the obtained information on a gear position. Specifically, load detection unit 157 calculates a load applied to blade 42 based on an equation (1) below.

"Load"="engine torque"×"reduction ratio"×"mechanical efficiency"×"tire load radius"/"the number of rotations of engine"    (1)

The reduction ratio is determined by information on a gear position. Mechanical efficiency and the tire load radius have already known values and they are stored in advance.

Swing control unit 361 will now be described. Swing control unit 361 controls revolution of swing circle 41. Specifically, when a load detected by load detection unit 157 is larger than reference value T, swing control unit 361 has swing circle 41 revolve in the direction in which blade angle θ is smaller than the blade angle at the time of detection of the load larger than reference value T as described with reference to FIG. 5. Specifically, swing control unit 361 outputs an operation command (electric signal) to control valve 134. Swing control unit 361 controls drive by stewing motor 49 by controlling an opening of control valve 134 in accordance with magnitude of a current value representing an output operation command. Swing control unit 361 receives information on an angle of rotation of the circle from circle rotation sensor 171. Swing control unit 361 corrects the current value representing the operation command to control valve 134 based on information on the angle of rotation of the circle from circle rotation sensor 171.

When a load detected after revolution of swing circle 41 in the direction to make blade angle θ smaller is smaller than reference value T, swing control unit 361 has swing circle 41 revolve in the direction in which blade angle θ becomes larger than when a load smaller than reference value T is detected.

Height control unit 362 will now be described. Height control unit 362 controls a position (height) in a vertical direction of blade 42. Height control unit 362 functions as means for moving blade 42 (movement control means) in the vertical direction (the up/down direction).

Height control unit 362 typically has blade 42 moved in a direction in which blade 42 is closer to front frame 22 (a direction in which blade 42 is away from the ground) when a load applied to blade 42 does not become smaller than reference value T even under the control by swing control unit 361. Specifically, when a load does not become smaller than reference value T even after blade angle θ is made smaller to a predetermined angle, height control unit 362 has blade 42 moved in a direction in which blade 42 is closer to front frame 22. Specifically, height control unit 362 controls drive of lift cylinders 44 and 45 by moving control valve 134.

When a load detected after movement of blade 42 in the direction toward front frame 22 is smaller than reference value T, height control unit 362 has blade 42 moved in a direction in which blade 42 is more distant from front frame 22 than when a load smaller than reference value T is detected.

The processing by height control unit 362 is described as below with attention being paid to a certain aspect.

(1) When a load detected at the time when blade angle θ is smaller to a predetermined angle as a result of revolution of swing circle 41 is at a second excessively large value larger than reference value T, height control unit 362 has blade 42 moved to a position closer to front frame 22 of motor grader 1 than a position of blade 42 at the time of detection of the second excessively large value.

Under such control, when a load detected at the time when the blade angle is smaller to the predetermined angle is at the second excessively large value larger than reference value T, blade 42 moves to a position closer to front frame 22 than a position at the time of detection of the second excessively large value. Therefore, an amount of soil held by blade 42 can be decreased. Since the load applied to blade 42 can thus be reduced, rear wheel 12 representing a drive wheel can normally rotate without idling. Therefore, works can proceed even though a high load is applied to blade 42. The second excessively large value is generally smaller than the first excessively large value described above.

(2) When a load detected after movement of blade 42 in the direction toward front frame 22 is at a second excessively small value smaller than reference value T, height control unit 362 has blade 42 moved to a position more distant from front frame 22 than a position of blade 42 at the time of detection of the second excessively small value.

Under such control, when a load applied to blade 42 is at the second excessively small value smaller than reference value T under the control to bring blade 42 closer to front frame 22, blade 42 moves to a position more distant from the front frame than the position at the time of detection of the second excessively small value. Therefore, an amount of soil held by the blade can be increased. Efficiency in works can thus be higher than when the blade is maintained close to the front frame.

In the above example, when a load applied to blade 42 does not become smaller than reference value T even under the control by swing control unit 361, height control unit 362 has blade 42 moved in the direction to bring blade 42 closer to front frame 22. Limitation thereto, however, is not intended. For example, when a load detected by load detection unit 157 is larger than predetermined reference value T, control by swing control unit 361 and control by height control unit 362 may simultaneously be carried out.

<F. Control Structure>

Figure 7:
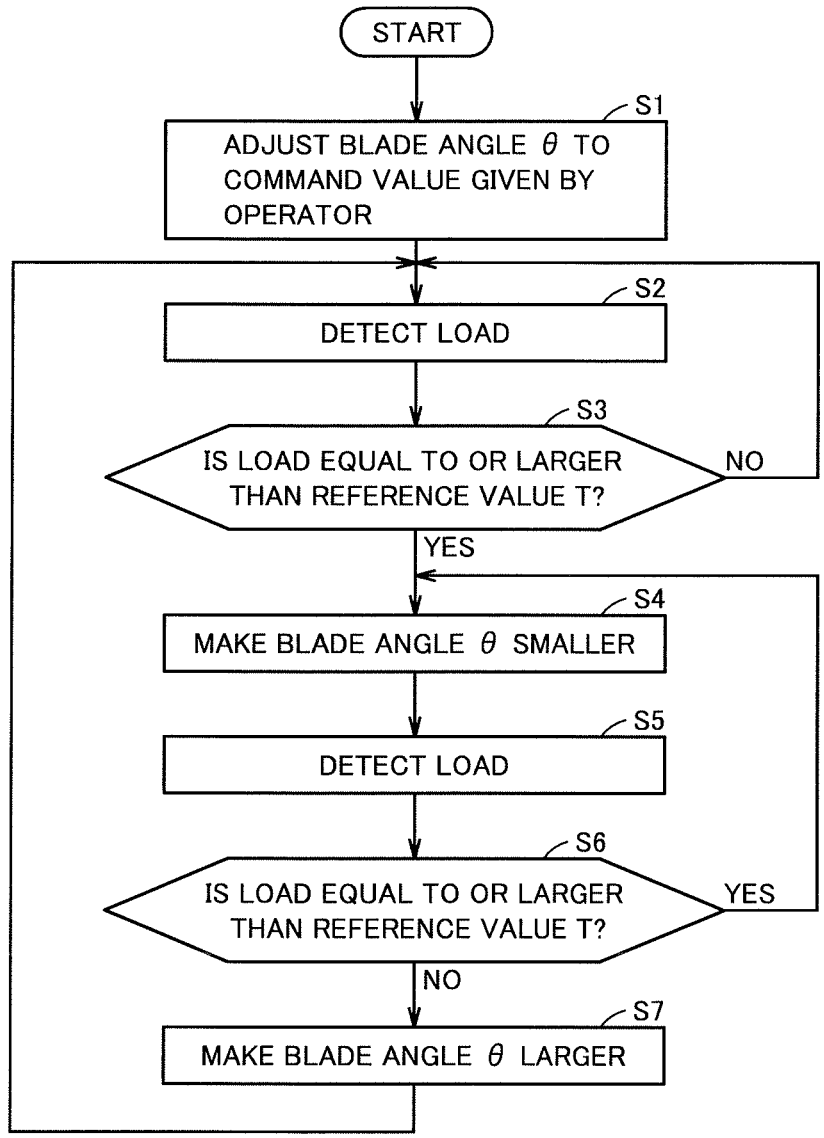
FIG. 7 is a flowchart for illustrating a typical example of control of a blade angle θ in the motor grader.

FIG. 7 is a flowchart for illustrating a typical example of control of blade angle θ in motor grader 1. Specifically, FIG. 7 shows a flow of processing when blade angle θ alone is controlled at the time of application of a load equal to or larger than reference value T to blade 42.

As shown in FIG. 7, in step S1, main controller 150 adjusts blade angle θ to a command value given by an operator. In step S2, main controller 150 detects a load applied to blade 42.

In step S3, main controller 150 determines whether or not the detected load is equal to or larger than reference value T. When the detected load is determined as being equal to or larger than reference value T (YES in step S3), main controller 150 has swing circle 41 revolve in step S4 such that blade angle θ is smaller than a current angle (an angle at the time when the load is determined as being equal to or larger than reference value T). When the detected load is determined as being smaller than reference value T (NO in step S3), the process returns to step S2.

In step S5, main controller 150 detects a load applied to the blade. In step S6, main controller 150 determines whether or not the detected load is equal to or larger than reference value T. When the detected load is determined as being equal to or larger than reference value T (YES in step S6), the process proceeds to step S4. When the detected load is determined as being smaller than reference value T (NO in step S6), main controller 150 has swing circle 41 revolve in step S7 such that blade angle θ is larger than a current angle (an angle at the time when the load is determined as being smaller than reference value T).

<G. Modification>

A load applied to blade 42 is detected by using torque output from the engine in the example above. A method of detecting a load, however, is not limited as such. For example, a sensor attached to a vehicular body of motor grader 1 may detect a load applied to blade 42. A configuration including such a sensor (representing one example of the "load detection device" in the present invention) will be described below with reference to FIGS. 8 and 9.

(1. First Modification)

Figure 8:
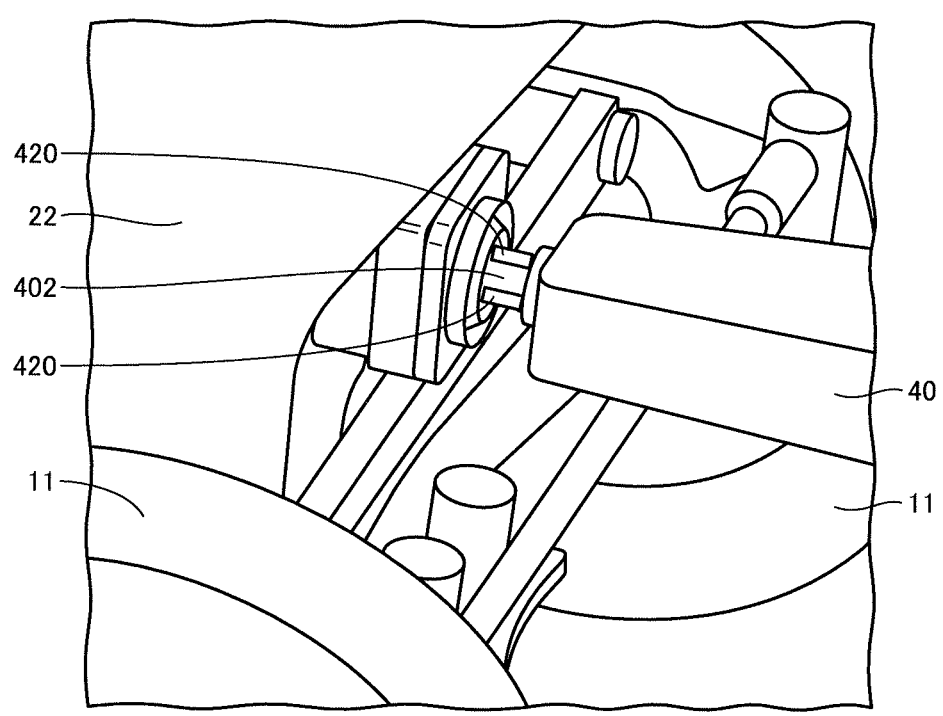
FIG. 8 is an enlarged view of a main portion of a portion of connection between a front frame and a draw bar.

FIG. 8 is an enlarged view of a main portion of a portion of connection between front frame 22 and draw bar 40. As shown in FIG. 8, a strain gauge 420 may be attached to an end portion of draw bar 40 on a side of front wheel 11 to detect a load applied to blade 42. Specifically, strain gauge 420 may be attached to a ball bearing portion 402 at a tip end of draw bar 40 to detect a load applied to blade 42.

A plurality of strain gauges 420 are typically provided on a surface of ball bearing portion 402. Main controller 150 determines whether or not a load applied to blade 42 exceeds reference value T based on outputs from the plurality of strain gauges 420.

(2. Second Modification)

Figure 9:
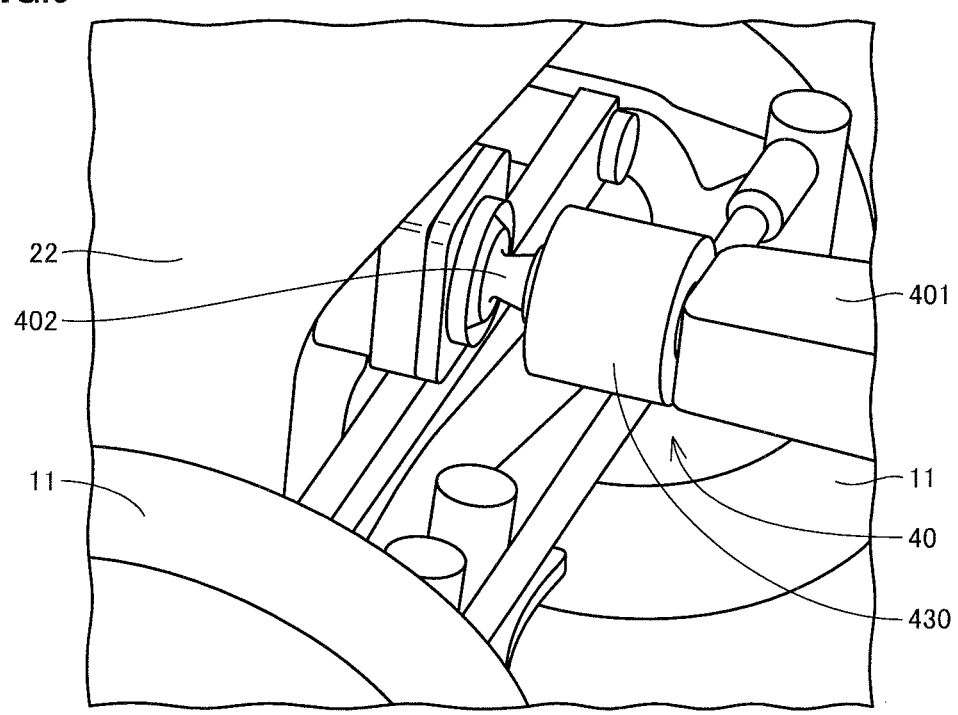
FIG. 9 is an enlarged view of the main portion of the portion of connection between the front frame and the draw bar.

FIG. 9 is an enlarged view of the main portion of the portion of connection between front frame 22 and draw bar 40. As shown in FIG. 9, a hydraulic sensor 430 may be attached to an end portion of draw bar 40 on the side of front wheel 11 to detect a load applied to blade 42. Specifically, hydraulic sensor 430 may be provided between a main body portion 401 of draw bar 40 and ball bearing portion 402.

In this case, main controller 150 determines whether or not a load applied to blade 42 exceeds reference value T based on an output from hydraulic sensor 430.

(3. Third Modification)

Figure 10:
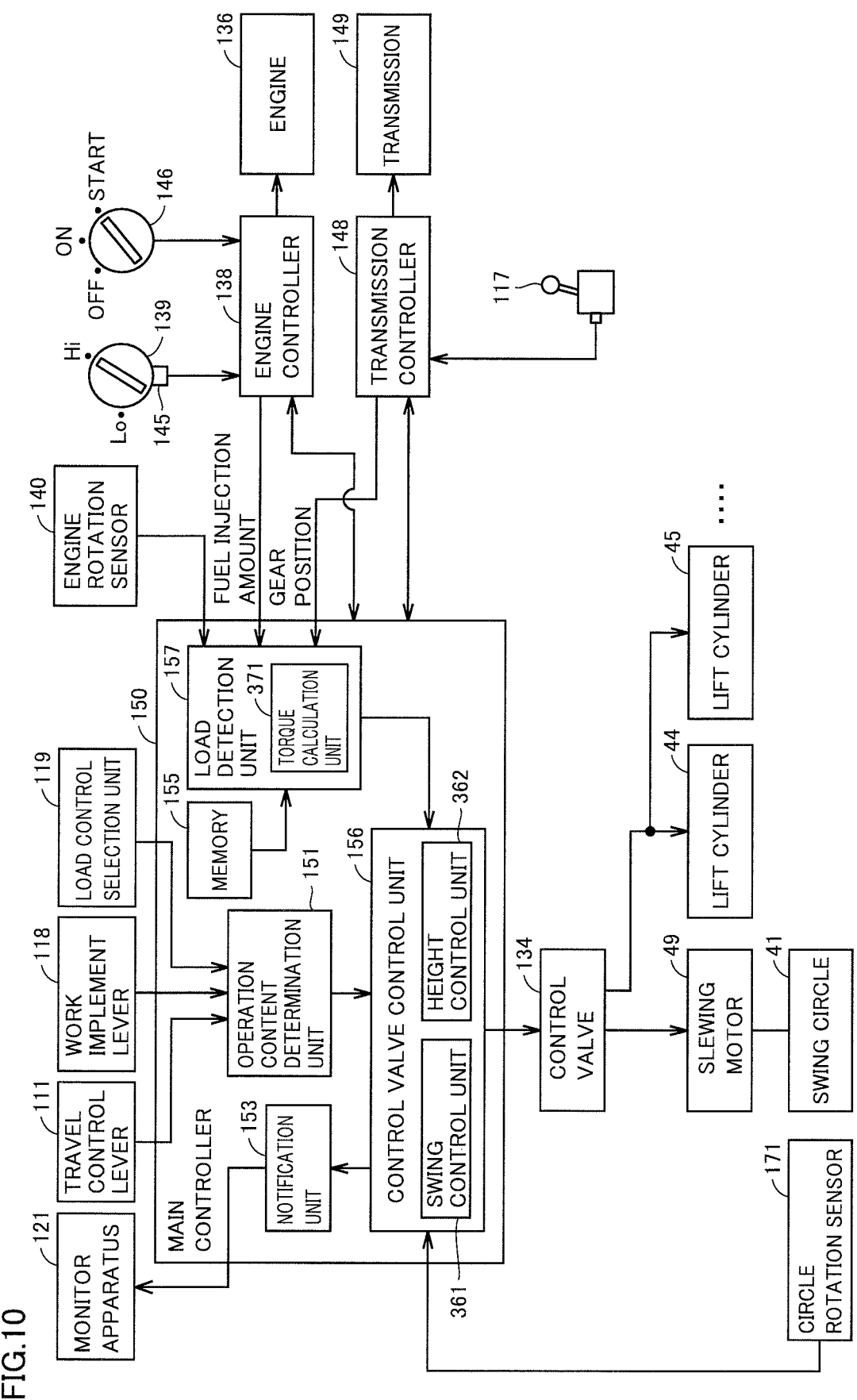
FIG. 10 is a functional block diagram illustrating the main controller in the control system of the motor grader in another embodiment.

FIG. 10 is a functional block diagram illustrating main controller 150 of the control system of motor grader 1 in a third modification. When the functional block diagram in FIG. 10 is compared with the functional block diagram in FIG. 6, a load control selection unit 119 is added in FIG. 10. Since FIG. 10 is otherwise the same as FIG. 6, description will not be provided.

In the above example, when a load applied to blade 42 does not become smaller than reference value T even under the control by swing control unit 361, height control unit 362 has blade 42 moved in the direction to bring blade 42 closer to front frame 22. Limitation thereto, however, is not intended.

For example, as shown in FIG. 10, load control selection unit 119 which can select between control by swing control unit 361 (revolution-based load control of blade 42) and control by height control unit 362 (height-based load control of blade 42) may be provided. In such a configuration, an operator selects between control by swing control unit 361 and control by height control unit 362 with load control selection unit 119.

Specifically, load control selection unit 119 is connected to main controller 150. More specifically, load control selection unit 119 is connected to operation content determination unit 151.

Operation content determination unit 151 determines whether load control selection unit 119 has selected control by height control unit 362 (height-based load control) or control by swing control unit 361 (revolution-based load control). When a load detected by load detection unit 157 is larger than predetermined reference value T, control valve control unit 156 is controlled under any of control by swing control unit 361 and control by height control unit 362 selected with load control selection unit 119.

When the detected load is at the first excessively large value larger than reference value T, motor grader 1 revolves swing circle 41 in the direction in which blade angle θ is smaller than blade angle θ at the time of detection of the first excessively large value, on condition that revolution-based load control is selected by load control selection unit 119.

When height-based load control is selected by load control selection unit 119 and when a detected load is at the first excessively large value larger than reference value T, motor grader 1 moves blade 42 to a position closer to front frame 22 of the motor grader than the position of blade 42 at the time of detection of the first excessively large value without revolving swing circle 41 (without carrying out revolution-based load control).

By thus providing load control selection unit 119 for selection of control contents by an operator in main controller 150, control of the blade in accordance with a purpose of works or a worksite can be realized. Load control selection unit 119 is implemented, for example, by an operation switch provided in cab 3.

<H. Additional Aspects>

(1) A control method is performed in a motor grader, the motor grader including a blade between a front wheel and a rear wheel, the blade being attached to a swing circle which adjusts a blade angle. The control method includes detecting a load applied to the blade and revolving, when the detected load is at a first excessively large value larger than a predetermined reference value, the swing circle in such a direction that the blade angle is smaller than the blade angle at the time of detection of the first excessively large value.

According to the method, when a load applied to the blade is at the first excessively large value larger than the predetermined reference value, the blade rotates in the direction to make the blade angle smaller than the blade angle at the time of detection of the first excessively large value. Therefore, according to the method, an amount of soil held by the blade can be decreased. Since the load applied to the blade can thus be reduced according to the method, the wheel of the motor grader can normally rotate without idling. Therefore, works can proceed even though a high load is applied to the blade.

(2) Preferably, the control method further includes moving, when the load detected at the time when the blade angle is made smaller to a predetermined angle as a result of revolution of the swing circle is at a second excessively large value larger than the reference value, the blade to a position closer to the front frame of the motor grader than a position of the blade at the time of detection of the second excessively large value.

According to the method, when a load detected at the time when the blade angle is made smaller to the predetermined angle is at the second excessively large value larger than the reference value, the blade moves to a position closer to the front frame than a position at the time of detection of the second excessively large value. Therefore, according to the method, an amount of soil held by the blade can be decreased. Since the load applied to the blade can thus be reduced according to the method, the wheel of the motor grader can normally rotate without idling. Therefore, works can proceed even though a high load is applied to the blade.

(3) Preferably, the control method further includes moving, when the load detected after movement of the blade toward the front frame is at a second excessively small value smaller than the reference value, the blade to a position distant from the front frame than a position of the blade at the time of detection of the second excessively small value.

According to the method, when a load applied to the blade is at the second excessively small value smaller than the reference value under the control to bring the blade closer to the front frame, the blade moves to a position more distant from the front frame than the position at the time of detection of the second excessively small value. Therefore, according to the method, an amount of soil held by the blade can be increased. Therefore, according to the method, efficiency in works can be higher than when the blade is maintained close to the front frame.

(4) Preferably, the control method further includes revolving, when the load detected after revolution of the swing circle in a direction to make the blade angle smaller is at a first excessively small value smaller than the reference value, the swing circle in a direction to make the blade angle larger than the blade angle at the time of detection of the first excessively small value.

According to the method, when a load applied to the blade is at the first excessively small value smaller than the reference value under the control to make the blade angle smaller, the blade rotates in the direction to make the blade angle larger than the blade angle at the time of detection of the first excessively small value. Therefore, according to the method, an amount of soil held by the blade can be increased. Therefore, according to the method, efficiency in works can be higher than when the blade angle is maintained small.

(5) Preferably, the control method further includes calculating torque output from an engine of the motor grader. In the detecting a load, the load is detected based on the calculated torque.

According to the method, a load applied to the blade can be detected by using torque output from the engine.

(6) Preferably, in the calculating torque, the torque is calculated based on the number of rotations of the engine and an amount of fuel injection in the engine.

According to the method, torque can be calculated. Therefore, a load applied to the blade can be detected.

(7) Preferably, in the detecting a load, the load is detected based on the calculated torque and information on a position of a gear in a transmission of the motor grader.

According to the method, since information on a position of the gear is taken into consideration in detecting a load applied to the blade, a load applied to the blade can be detected more accurately than in a configuration without taking information on a gear position into consideration.

(8) Preferably, in the detecting a load, the load is detected by a sensor attached to the motor grader. According to the method, a load applied to the blade can be detected.

(9) A motor grader includes a blade between a front wheel and a rear wheel, the blade being attached to a swing circle which adjusts a blade angle. The motor grader includes a load detection device configured to detect a load applied to the blade and a controller configured to control revolution of the swing circle. When the detected load is at a first excessively large value larger than a predetermined reference value, the controller is configured to revolve the swing circle in such a direction that the blade angle is smaller than the blade angle at the time of detection of the first excessively large value.

According to such a configuration, when a load applied to the blade is at the first excessively large value larger than the predetermined reference value, the blade rotates in the direction to make the blade angle smaller than the blade angle at the time of detection of the first excessively large value. Therefore, according to the configuration, an amount of soil held by the blade can be decreased. Since the load applied to the blade can be reduced according to the configuration, the wheel of the motor grader can normally rotate without idling. Therefore, works can proceed even though a high load is applied to the blade.

(10) Preferably, the controller is configured to further control movement of the blade in the up/down direction. When a load detected at the time when the blade angle becomes smaller to a predetermined angle as a result of revolution of the swing circle is at a second excessively large value larger than the reference value, the controller is configured to move the blade to a position closer to the front frame of the motor grader than a position of the blade at the time of detection of the second excessively large value.

According to such a configuration, when a load detected at the time when the blade angle becomes smaller to the predetermined angle is at the second excessively large value larger than the reference value, the blade moves to a position closer to the front frame of the motor grader than a position at the time of detection of the second excessively large value. Therefore, according to the configuration, an amount of soil held by the blade can be decreased. Since the load applied to the blade can thus be reduced according to the configuration, the wheel of the motor grader can normally rotate without idling. Therefore, works can proceed even though a high load is applied to the blade.

(11) Preferably, when the load detected after movement of the blade in the direction toward the front frame is at a second excessively small value smaller than the reference value, the controller is configured to move the blade to a position more distant from the front frame than a position of the blade at the time of detection of the second excessively small value.

According to such a configuration, when a load applied to the blade is at the second excessively small value smaller than the reference value under the control to bring the blade closer to the front frame, the blade moves to a position more distant from the front frame than the position at the time of detection of the second excessively small value. Therefore, according to the configuration, an amount of soil held by the blade can be increased. Therefore, according to the configuration, efficiency in works can be higher than when the blade is maintained close to the front frame.

(12) Preferably, when the load detected after revolution of the swing circle in a direction to make the blade angle smaller is at a first excessively small value smaller than the reference value, the controller is configured to revolve the swing circle in a direction to make the blade angle larger than the blade angle at the time of detection of the first excessively small value.

According to such a configuration, when a load applied to the blade is at the first excessively small value smaller than the reference value under the control to make the blade angle smaller, the blade rotates in the direction to make the blade angle larger than the blade angle at the time of detection of the first excessively small value. Therefore, according to the configuration, an amount of soil held by the blade can be increased. Therefore, according to the configuration, efficiency in works can be higher than when the blade angle is maintained small.

(13) Preferably, the load detection device is configured to calculate torque output from an engine of the motor grader. The load detection device is configured to detect the load based on the calculated torque.

According to such a configuration, a load applied to the blade can be detected by using torque output from the engine.

(14) Preferably, the load detection device is configured to calculate the torque based on the number of rotations of the engine and an amount of fuel injection in the engine.

According to such a configuration, torque can be calculated. Therefore, a load applied to the blade can be detected.

(15) Preferably, the load detection device is configured to detect the load based on the calculated torque and information on a position of a gear in a transmission of the motor grader.

According to such a configuration, since information on a position of the gear is taken into consideration in detecting a load applied to the blade, a load applied to the blade can be detected more accurately than in a configuration without taking information on a gear position into consideration.

(16) Preferably, the load detection device is implemented by a sensor. The sensor is attached to a vehicular body of the motor grader. According to such a configuration, a load applied to the blade can be detected.

(17) Preferably, the motor grader further includes a draw bar configured to support the swing circle. The sensor is implemented by a strain gauge or a hydraulic sensor and attached to an end portion of the draw bar on a side of the front wheel.

According to such a configuration, the strain gauge or the hydraulic sensor attached to the end portion of the draw bar on the side of the front wheel can detect a load applied to the blade.

(18) Preferably, the motor grader further includes a load control selection unit configured to select any of revolution-based load control of the blade and height-based load control of the blade. The controller is configured to further control movement of the blade in the up/down direction. When the detected load is at the first excessively large value, the controller has the swing circle revolve in a direction to make the blade angle smaller than the blade angle at the time of detection of the first excessively large value, on condition that the revolution-based load control is selected by the load control selection unit. When the detected load is at the first excessively large value and when the height-based load control is selected by the load control selection unit, the controller has the blade move to a position closer to the front frame of the motor grader than a position of the blade at the time of detection of the first excessively large value without revolving the swing circle.

According to such a configuration, since selection between revolution-based load control of the blade and height-based load control of the blade can be made, control of the blade in accordance with a purpose of works or a worksite can be realized.

The embodiments disclosed herein are illustrative and not restricted to the above disclosure alone. The scope of the present invention is defined by the terms of the claims and is intended to include any modifications within the scope and meaning equivalent to the terms of the claims.

REFERENCE SIGNS LIST 1 motor grader; 2 vehicular body frame; 3 cab; 4 work implement; 11 front wheel; 12 rear wheel; 19 axle shaft; 21 rear frame; 22 front frame; 40 draw bar; 41 swing circle; 42 blade; 44, 45 lift cylinder; 46 draw bar shift cylinder; 47 blade shift cylinder; 48 tilt cylinder; 49 slewing motor; 111 travel control lever; 117 gear shift lever; 118 work implement lever; 119 load control selection unit; 131A first hydraulic pump; 131B second hydraulic pump; 134 control valve; 136 engine; 138 engine controller; 139 throttle dial; 140 engine rotation sensor; 143 switch valve; 148 transmission controller; 149 transmission; 150 main controller; 151 operation content determination unit; 154 engine output control unit; 155 memory; 156 control valve control unit; 157 load detection unit; 171 circle rotation sensor; 361 swing control unit; 362 height control unit; 371 torque calculation unit; 401 main body portion; 402 ball bearing portion; 420 strain gauge; 430 hydraulic sensor; 910 rotation axis; and 920 central axis

The invention claimed is:

1. A control method in a motor grader, the motor grader including a blade between a front wheel and a rear wheel, the blade being attached to a swing circle which adjusts a blade angle, the control method comprising:
  detecting a load applied to the blade;
  comparing the detected load with a predetermined reference value; and revolving the swing circle, wherein
in revolving the swing circle,
when the detected load is at a first excessively large value larger than the predetermined reference value, the swing circle is revolved in such a direction that the blade angle is smaller than the blade angle in detection of the first excessively large value, and
when the load detected is at a first excessively small value smaller than the reference value, the swing circle is revolved in a direction to make the blade angle larger than the blade angle in detection of the first excessively small value.

2. The control method according to claim 1, further comprising moving a position of the blade up and down, wherein
in the moving of the position of the blade up and down, when the load detected when the blade angle becomes smaller to a predetermined angle as a result of revolution of the swing circle is at a second excessively large value larger than the reference value, the blade is moved to a position closer to a front frame of the motor grader than a position of the blade in detection of the second excessively large value.

3. The control method according to claim 2, further comprising moving, when the load detected after movement of the blade toward the front frame is at a second excessively small value smaller than the reference value, the blade to a position more distant from the front frame than a position of the blade in detection of the second excessively small value.

4. The control method according to claim 1, wherein,
in the revolving of the swing circle,
when the load detected after revolution of the swing circle in a direction to make the blade angle smaller is at a first excessively small value smaller than the reference value, the swing circle is revolved in a direction to make the blade angle larger than the blade angle in detection of the first excessively small value.

5. The control method according to claim 1, further comprising calculating torque output from an engine of the motor grader, wherein
in the detecting of a load, the load is detected based on the calculated torque.

6. The control method according to claim 5, wherein
in the calculating of torque, the torque is calculated based on the number of rotations of the engine and an amount of fuel injection in the engine.

7. The control method according to claim 5, wherein
in the detecting of a load, the load is detected based on the calculated torque and information on a position of a gear in a transmission of the motor grader.

8. The control method according to claim 1, wherein
in the detecting of a load, the load is detected by a sensor attached to the motor grader.

9. A motor grader comprising:
a swing circle configured to adjust a blade angle;
a front wheel;
a rear wheel;
a blade attached to the swing circle, the blade being provided between the front wheel and the rear wheel;
a load detection device configured to detect a load applied to the blade; and
a controller configured to control revolution of the swing circle, wherein
when the detected load is at a first excessively large value larger than a predetermined reference value, the controller is configured to revolve the swing circle in such a direction that the blade angle is smaller than the blade angle in detection of the first excessively large value, and
when the load detected is at a first excessively small value smaller than the reference value, the controller is configured to revolve the swing circle in a direction to make the blade angle larger than the blade angle in detection of the first excessively small value.

10. The motor grader according to claim 9, wherein
the controller is further configured to
control movement of the blade in an up/down direction, and
move, when the load detected when the blade angle becomes smaller to a predetermined angle as a result of revolution of the swing circle is at a second excessively large value larger than the reference value, the blade to a position closer to a front frame of the motor grader than a position of the blade in detection of the second excessively large value.

11. The motor grader according to claim 10, wherein
the controller is configured to move, when the load detected after movement of the blade toward the front frame is at a second excessively small value smaller than the reference value, the blade to a position more distant from the front frame than a position of the blade in detection of the second excessively small value.

12. The motor grader according to claim 9, wherein
the controller is configured to revolve, when the load detected after revolution of the swing circle in a direction to make the blade angle smaller is at a first excessively small value smaller than the reference value, the swing circle in a direction to make the blade angle larger than the blade angle in detection of the first excessively small value.

13. The motor grader according to claim 9, wherein
the load detection device is configured to calculate torque output from an engine of the motor grader and to detect the load based on the calculated torque.

14. The motor grader according to claim 13, wherein
the load detection device is configured to calculate the torque based on the number of rotations of the engine and an amount of fuel injection in the engine.

15. The motor grader according to claim 13, wherein
the load detection device is configured to detect the load based on the calculated torque and information on a position of a gear in a transmission of the motor grader.

16. The motor grader according to claim 9, wherein
the load detection device is implemented by a sensor, and
the sensor is attached to a vehicular body of the motor grader.

17. The motor grader according to claim 16, the motor grader further comprising a draw bar constructed to support the swing circle, wherein
the sensor is implemented by a strain gauge or a hydraulic sensor and attached to an end portion of the draw bar on a side of the front wheel.

18. The motor grader according to claim 9, further comprising a load control selection unit configured to select any of revolution-based load control of the blade and height-based load control of the blade, wherein
the controller is configured to
further control movement of the blade in an up/down direction, and
when the detected load is at the first excessively large value,
revolve the swing circle in a direction to make the blade angle smaller than the blade angle in detection of the first excessively large value, on condition that the revolution-based load control is selected by the load control selection unit, and move the blade to a position closer to a front frame of the motor grader than a position of the blade in detection of the first excessively large value without revolving the swing circle when the height-based load control is selected by the load control selection unit.

19. A control method in a motor grader, the motor grader including a blade between a front wheel and a rear wheel, the blade being attached to a swing circle which adjusts a blade angle, the control method comprising:

detecting a load applied to the blade;

calculating torque output from an engine of the motor grader; and revolving, when the detected load is at a first excessively large value larger than a predetermined reference value, the swing circle in such a direction that the blade angle is smaller than the blade angle in detection of the first excessively large value, wherein in the detecting of the load, the load is detected based on the calculated torque and information on a position of a gear in a transmission of the motor grader.

20. A motor grader comprising:

a swing circle configured to adjust a blade angle;

a front wheel;

a rear wheel;

a blade attached to the swing circle, the blade being provided between the front wheel and the rear wheel;

a load detection device configured to:
  detect a load applied to the blade, and
  calculate torque output from an engine of the motor grader; and a controller configured to control revolution of the swing circle, wherein when the detected load is at a first excessively large value larger than a predetermined reference value, the controller is configured to revolve the swing circle in such a direction that the blade angle is smaller than the blade angle in detection of the first excessively large value, and the load detection device is configured to detect the load based on the calculated torque and information on a position of a gear in a transmission of the motor grader.

21. A motor grader comprising:

a swing circle configured to adjust a blade angle;

a front wheel;

a rear wheel;

a blade attached to the swing circle, the blade being provided between the front wheel and the rear wheel;

a draw bar constructed to support the swing circle;

a load detection device configured to detect a load applied to the blade; and a controller configured to control revolution of the swing circle, wherein when the detected load is at a first excessively large value larger than a predetermined reference value, the controller is configured to revolve the swing circle in such a direction that the blade angle is smaller than the blade angle in detection of the first excessively large value, the load detection device is implemented by a sensor, and the sensor is implemented by a strain gauge or a hydraulic sensor and attached to an end portion of the draw bar on a side of the front wheel.

22. A motor grader comprising:

a swing circle configured to adjust a blade angle;

a front wheel;

a rear wheel;

a blade attached to the swing circle, the blade being provided between the front wheel and the rear wheel;

a load detection device configured to detect a load applied to the blade;

a load control selection unit configured to select any of revolution-based load control of the blade and height-based load control of the blade; and a controller configured to control revolution of the swing circle, wherein when the detected load is at a first excessively large value larger than a predetermined reference value, the controller is configured to revolve the swing circle in such a direction that the blade angle is smaller than the blade angle in detection of the first excessively large value, and the controller is configured to further control movement of the blade in an up/down direction, and when the detected load is at the first excessively large value, revolve the swing circle in a direction to make the blade angle smaller than the blade angle in detection of the first excessively large value, on condition that the revolution-based load control is selected by the load control selection unit, and move the blade to a position closer to a front frame of the motor grader than a position of the blade in detection of the first excessively large value without revolving the swing circle when the height-based load control is selected by the load control selection unit.

* * * * *